(12) United States Patent
Gilder (10) Patent No.: US 9,811,563 B2
(45) Date of Patent: Nov. 7, 2017

(54) SYSTEM AND METHOD FOR RECURSIVELY ITERATING OVER A LOOSELY ASSOCIATED DATA STRUCTURE

(71) Applicant: NETSUITE INC., San Mateo, CA (US)

(72) Inventor: David Gilder, Austin, TX (US)

(73) Assignee: NETSUITE Inc., San Mateo, CA (US)

( * ) Notice: Subject to any disclaimer, the term of this patent is extended or adjusted under 35 U.S.C. 154(b) by 790 days.

(21) Appl. No.: 14/028,046

(22) Filed: Sep. 16, 2013

(65) Prior Publication Data

US 2017/0235795 A1    Aug. 17, 2017

Related U.S. Application Data

(60) Provisional application No. 61/702,145, filed on Sep. 17, 2012.

(51) Int. Cl.
G06F 17/30 (2006.01)

(52) U.S. Cl.
CPC ............................. *G06F 17/30513* (2013.01)

(58) Field of Classification Search
CPC ..... Y10S 707/99944; Y10S 707/99945; G06F 17/30286; G06F 17/30587; G06F 17/30589; G06F 17/30607

USPC ....... 707/754, 769, 790, 791, 793, 796, 797, 707/802, 999.103, 999.104; 715/853, 854

See application file for complete search history.

(56) References Cited

U.S. PATENT DOCUMENTS

| | | | | |
|---|---|---|---|---|
| 6,058,209 | A * | 5/2000 | Vaidyanathan | .... G06K 9/00127 382/133 |
| 7,701,877 | B1 * | 4/2010 | Rozenman | .............. H04L 41/12 370/254 |
| 2009/0222473 | A1 * | 9/2009 | Chowdhury | ...... G06F 17/30961 |
| 2009/0307673 | A1 * | 12/2009 | Eichenberger | .......... G06F 8/452 717/160 |

* cited by examiner

*Primary Examiner* — Mark D Featherstone
*Assistant Examiner* — Diedra McQuitery (57) ABSTRACT

A data structure and its characteristics, and an associated process for searching the structure in a manner that ensures that each node or data location is traversed regardless of which node is the starting point of the traversal process. An embodiment of the invention may be used to locate a node of a data structure so that it may be processed or otherwise manipulated, such as by eliminating a node, moving a node, processing the data associated with a node, etc. In some embodiments, a combination of a "loosely associated" data structure and a specified method of traversing the data structure provide an efficient way to structure and administer a database, and provide a scalable and computationally efficient solution to the problems posed by conventional and more "tightly associated" structures.

15 Claims, 5 Drawing Sheets

SYSTEM AND METHOD FOR RECURSIVELY ITERATING OVER A LOOSELY ASSOCIATED DATA STRUCTURE

CROSS REFERENCE TO RELATED APPLICATION

This application claims the benefit of U.S. Provisional Application No. 61/702,145, entitled "Method for Recursively Iterating over a Loosely Associated. Data Structure," filed Sep. 17, 2012, which is incorporated herein by reference in its entirety for all purposes.

BACKGROUND

A database is an organized collection of logically-related data, typically in digital form. The data are typically organized in a schema that is intended to model relevant aspects of how the data (for example, the availability of rooms in hotels) may be used. Thus the database may be defined and/or structured in a way that supports processes requiring the stored information (for example, finding a hotel with vacancies). The data in a database can be viewed as a part of a larger database system that includes (1) a data model, which defines the structure of how the data in the database is organized and interrelated, and (2) a database management system (DBMS), which is a software package that controls the creation, maintenance and use of the database. The DBMS effectively acts as a shell, surrounding the data and controlling the interactions between the data and the outside world.

Each database stores and organizes data according to a particular data structure. Data structures are generally based on the ability of a computer to fetch and store data at any place in its memory, specified by an address, which is a bit string that can be itself stored in memory and manipulated by the program. An extremely simple data structure, the "record" data structure, stores values in one or more of a fixed number of fields. For instance, a date record may have a year field, a month field and a date field. An "array" data structure stores data as collections of elements indexed by one or more identifying keys. An array differs from a record in that arrays typically do not have a fixed number of fields, the fields are identified by index rather than by name, and each field generally must contain the same type of data (e.g., integer, text string, etc.). The access and manipulation of data stored in record and array type data structures is enabled by the computation of the addresses of data items using arithmetic operations.

When discussing data structures, it can be helpful to describe them with reference to certain identifying characteristics or qualities. One such characteristic or quality is that of the relative "tightness" or "looseness" of the association (s) between data in a data structure. The concept of tightly or loosely associated data structures is similar in some respects to that of the computer science concept of tight and loose coupling. In a "tightly" coupled system, changes in one area can have significant impact and cause changes in another area. In a "loosely" coupled system, changes in one area have minimal or negligible impact on another area. For example, given a tightly coupled pair of objects, changes to internal functions of the first object (A) would alter object A's data or functional return values in a manner that would require adjustment of the second object's (B) internal functions in order to maintain existing inter-object functionality. In contrast, in a loosely coupled pair of objects, changes to the internal functions of object A would have little or no impact on the internal functions of object B.

Figures 1A, 1B:
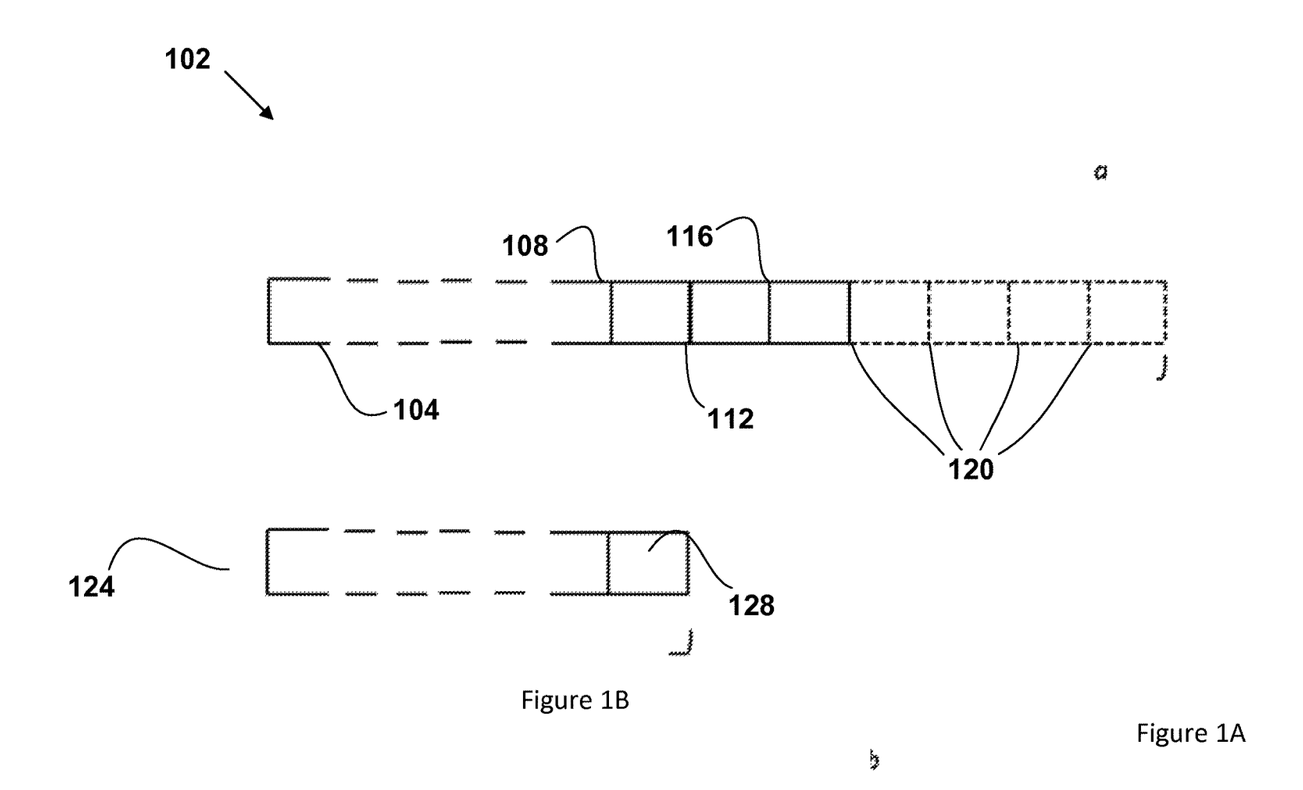
FIG. 1A is a schematic diagram illustrating an exemplary data record in a "tightly associated" data structure.
FIG. 1B is a schematic diagram illustrating an exemplary data record in a "loosely associated" data structure.

Referring to FIG. 1A (which is a schematic diagram illustrating an exemplary data record in a "tightly associated" data structure), in a typical database configuration, members of a data structure 102, referred to as elements or nodes, include a data field 104, where the actual information of use to a user is stored, and up to three fields to identify the members' relationship with other members of the data structure, such as parent 108, child 112, and group 116 identifiers. This creates a "tight" relationship structure (relatively speaking) between members of the data set that can be easily queried, but requires additional storage space in the database and the use of more complex queries and query processing. Intersecting branches, where nodes of one data structure reference nodes of additional data structures one or more times, can also become problematic, as some nodes in one or more of the collection of data structures may require parsing multiple times, while other nodes may cross reference back to a node in one or more data structures that precedes the intersecting nodes, creating a loop.

In such a "tightly" associated data structure or database, each node stored in a database record may contain multiple association references to additional database records of other nodes. These association references establish relationships between different entities. Modifying the association references of a given node would then also require modifications of the other database records storing the associated nodes in order to maintain accurate association references and enable efficient use of the data structures and database.

For example, given a node with both parent, child, and group associations, moving a node from one group to another may require as many as ten database transactions to ensure accurate records. To begin, the database is queried to find the originating node's record, which provides the associated parent and child record identifiers, for a total of one database transaction. The database is then queried for the child node record, which is then updated to point to the originating node's parent record, for a cumulative total of three transactions. The database is then queried to find the originating node's parent's record, which is then updated to point its child association to the originating node's associated child record, for a cumulative total of five transactions. The database is then queried to find the originating node's new parent record, which is then updated to point its child association to the originating node's record, for a cumulative total of seven transactions. The database is then queried for the new parent record's original associated child record, which is then updated to point its parent association to the originating node's record, for a cumulative total of nine transactions. Finally the originating node is updated with its new parent, child, and group association values, for a grand total of ten database transactions. As should be apparent, as the number of nodes and possible associations increases, a substantial amount of resources may be expended doing little more than maintaining a database so that it can continue to be used.

Table 1 shows a 26 node database table, organized by row and column, with each row configured in a manner similar to the data structure depicted in FIG. 1A. The 'Node' column identifies each node by the alphabetic label referenced in FIG. 2. The 'Address' column represents the memory address of each node in the data structure. The 'Data Fields' column represents the data contained in each node. Each node may be associated with one or more nodes based on the value of several database columns. The 'Group' column represents one of six groups with which the node may be associated. The 'Parent' column represents the alphabetic label of the parent node that is associated with this node. The 'Parent Address' column references the memory address that can be used to find the associated parent node in the data structure. The 'Child' column represents the alphabetic label of the child node that is associated with this node. The 'Child Address' column references the memory address that can be used to find the associated child node in the data structure. For example, node J has a parent association with node E, and its 'Child' and 'Child Address' columns are set to the values 'E' and '4n' respectively. Node J also has a child association with node O, with its 'Parent' and 'Parent Address' columns set to the values 'O' and '14n' respectively. As an example, the relationship between the nodes represented in Table 1 is shown graphically in FIG. 2.

Compared to a "loosely" associated data structure, and using a standard integer based identifier, a "tightly" associated data structure requires one to two extra columns per database row, for example the 'Child' and 'Child Address' columns, which require an additional four to eight bytes of data storage. If the fields are indexed (as suggested by element 120 of FIG. 1A) to improve performance, then this can further add an additional 8 bytes per row. Altogether, a typical scenario would require an additional 12 to 16 bytes per database row for the columns required to tightly associate the data structure with a single child.

TABLE 1

| Node | Address | Data Fields | Group | Parent | Parent Address | Children | Child Addresses |
|---|---|---|---|---|---|---|---|
| A | 0 | aaa | 1 | F | 5n | N/A | Null |
| B | n | bbb | 1 | F | 5n | N/A | Null |
| C | 2n | ccc | 1 | G | 6n | N/A | Null |
| D | 3n | ddd | 1 | Q | 16n | N/A | Null |
| E | 4n | eee | 2 | J | 9n | N/A | Null |
| F | 5n | fff | 2 | L | 11n | A, B | 0, n |
| G | 6n | ggg | 2 | L | 11n | C | 2n |
| H | 7n | hhh | 2 | P | 15n | N/A | Null |
| I | 8n | iii | 2 | O | 14n | N/A | Null |
| J | 9n | jjj | 2 | O | 14n | E | 4n |
| K | 10n | kkk | 3 | P | 15n | N/A | Null |
| L | 11n | lll | 3 | P | 15n | F, G | 5n, 6n |
| M | 12n | mmm | 3 | Q | 16n | N/A | Null |
| N | 13n | nnn | 3 | Q | 16n | N/A | Null |
| O | 14n | ooo | 3 | T | 19n | I, J | 8n, 9n |
| P | 15n | ppp | 4 | U | 20n | H, K, L | 7n, 10n, 11n |
| Q | 16n | qqq | 4 | U | 20n | D, M, N | 3n, 12n, 13n |
| R | 17n | rrr | 4 | Y | 24n | N/A | Null |
| S | 18n | sss | 4 | X | 23n | N/A | Null |
| T | 19n | ttt | 4 | X | 23n | O | 14n |
| U | 20n | uuu | 5 | Null | 13n | P, Q | 15n, 16n |
| V | 21n | vvv | 4 | Y | 24n | N/A | Null |
| W | 22n | www | 4 | Z | 25n | N/A | Null |
| X | 23n | xxx | 5 | Z | 25n | S, T | 18n, 19n |
| Y | 24n | yyy | 5 | Z | 25n | R, V | 17n, 21n |
| Z | 25n | zzz | 6 | O | 14n | W, X, Y | 22n, 23n, 24n |

Embodiments of the invention are directed toward reducing the required data storage, simplifying the associations between nodes, and more efficiently iterating over a "loosely" associated data structure when compared to conventional approaches using a "tightly" associated structure. Embodiments of the invention solve these and other problems both individually and collectively.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the invention are generally directed to a data structure and its characteristics and to an associated process for searching the structure in a manner that ensures that each node or data location is traversed regardless of which node is the starting point of the traversal process. An embodiment of the invention may be used to locate a node of a data structure so that it may be processed or otherwise manipulated, such as by eliminating a node, moving a node, processing the data associated with a node, etc. In some embodiments, a combination of a "loosely associated" data structure and a specified method of traversing the data structure provide an efficient way to structure and administer a database, and provide a scalable and computationally efficient solution to the problems posed by conventional and more "tightly associated" structures. In some embodiments, a combination of reduced data storage requirements and reduced administrative "overhead" required to manage the data structure provides benefits and advantages in comparison to conventional approaches to defining and administering data bases and other similar data storage elements.

In one embodiment, the invention is directed to a method of performing a processing step on each node of a loosely associated data structure, where the method includes:
 (a) receiving an identifier of an initial node of the loosely associated data structure;
 (b) determining whether the processing step has already been performed on the initial node;
 (c) determining a node or nodes that refer to the initial node as an originator node;
 (d) determining a node identified as an originator node of the initial node;
 (e) adding the node or nodes that refer to the initial node as an originator node and the originator node of the initial node to a stored list;
 (f) filtering the stored list to remove one or more duplicate nodes;
 (g) performing steps (a) through (f) for at least one node identified in the stored list; and
 (h) performing the processing step on the initial node.

In another embodiment, the invention is directed to a system, where the system includes:
 a loosely associated data structure containing a plurality of nodes;

a processor programmed to implement a search process in response to a search query, wherein the search process comprises
  (a) receiving an identifier of an initial node of the loosely associated data structure;
  (b) determining whether a processing step has already been performed on the initial node;
  (c) determining a node or nodes that refer to the initial node as an originator node;
  (d) determining a node identified as an originator node of the initial node;
  (e) adding the node or nodes that refer to the initial node as an originator node and the originator node of the initial node to a stored list;
  (f) filtering the stored list to remove one or more duplicate nodes;
  (g) performing steps (a) through (f) for at least one node identified in the stored list; and
  (h) performing the processing step on the initial node.

In yet another embodiment, the invention is directed to an apparatus operable to implement a search of a data structure in response to a search query, where the apparatus includes:
  a processor programmed to execute a set of instructions
  a data storage element in which the set of instructions are stored
  a database comprising a plurality of nodes, wherein each node is associated with an originating node, and wherein when executed by the processor the set of instructions cause the apparatus to
    (a) receive an identifier of an initial node of the loosely associated data structure;
    (b) determine whether a processing step has already been performed on the initial node;
    (c) determine a node or nodes that refer to the initial node as an originator node;
    (d) determine a node identified as an originator node of the initial node;
    (e) add the node or nodes that refer to the initial node as an originator node and the originator node of the initial node to a stored list;
    (f) filter the stored list to remove one or more duplicate nodes;
    (g) perform steps (a) through (f) for at least one node identified in the stored list; and
    (h) perform the processing step on the initial node.

Other objects and advantages of the present invention will be apparent to one of ordinary skill in the art upon review of the detailed description of the invention and the included figures.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying or requiring any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art.

Among other things, the present invention may be embodied in whole or in part as a system, as one or more methods, or as one or more apparatuses or devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc. that is a component of a computing device or data processing device, such as a server and an associated data storage or database) that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

As recognized by the inventor, in a conventional "tightly associated" data structure, a given node with multiple associations may require, in addition to its own data insertions or updates, multiple additional database insertions or updates for its associated nodes in order to correctly maintain existing associations, or to establish new associations that are required for proper use of the database. Later changes to the association(s) of such a tightly associated node can require more database insertions or updates in order to fully replace the existing association(s) and establish the new associations. These scenarios are examples of situations in which use of a conventional tightly associated data structure may lead to relatively high administrative overhead and resulting inefficiencies in data access and data processing, particularly as the size of a database increases.

In contrast, the inventive "loosely associated" data structure utilizes a single association identifier, and when implemented with the inventive database query search method described herein (for traversing a database composed of nodes defined by such a structure), has several important advantages when compared to conventional data structures and search methods. These advantages include, but are not limited to lower database storage requirements and fewer processing requirements for situations in which a node is added to the structure, a node is removed from the structure, or the data associated with a node is processed compared to a conventional tightly associated database structure. A given node in such a loosely associated data structure requires only a single database insertion or update for its own data. Further, later changes to the association(s) of the node require only a single database update. The inventive data structure and associated search processing method combine to provide a computationally efficient and scalable solution to the problems posed by conventional tightly associated data structures. In some embodiments, the combination of reduced data storage requirements and reduced administrative "overhead" required to manage the data structure provides benefits and advantages in comparison to conventional approaches to defining and administering data bases and other similar data storage elements.

In the inventive loosely associated data structure, modifications can be made to a given entity database record without changes being required for other entity database records. Thus, the loosely associated data structure has the advantage that fewer database columns are required to represent the associations in the database record. In the inventive loosely associated data structure, only a single parent association is required, with all other associations being derivable by application of the inventive algorithmic processing with defined boundaries. This allows a significant reduction to the overall data storage or memory space used to store a given database record. An additional advantage of the inventive loosely associated data structure is that fewer database update calls are required to maintain and modify the database records when changing or creating associations between entities. This significantly reduces the administrative overhead required to maintain and update a database.

For example, given a node with a parent association, in an embodiment of the invention, moving a node from one group to another may require as few as four database transactions. To begin, the database is queried to find the originating node's record, which provides the associated parent record identifier, for a total of one database transaction. Then the database is queried for one or more nodes that have a parent association to the originating node as their parent, which are then updated to point to the originating node's parent record, for a cumulative total of three transactions. Finally the originating node is updated with its new parent association value, for a total of four database transactions.

Table 2 shows the same 26 element database as Table 1, but configured in accordance with an example of the inventive loosely associated data structure, wherein each node includes a data field and a pointer to a single, originating node (i.e., the Originating Node Address).

TABLE 2

| Node | Address | Data Fields | Originating Node | Originating Node Address |
|------|---------|-------------|------------------|--------------------------|
| A | 0 | aaa | F | 5m |
| B | m | bbb | F | 5m |
| C | 2m | ccc | G | 6m |
| D | 3m | ddd | Q | 16m |
| E | 4m | eee | J | 9m |
| F | 5m | fff | L | 11m |
| G | 6m | ggg | L | 11m |
| H | 7m | hhh | P | 15m |
| I | 8m | iii | O | 14m |
| J | 9m | jjj | O | 14m |
| K | 10m | kkk | P | 15m |
| L | 11m | lll | P | 15m |
| M | 12m | mmm | Q | 16m |
| N | 13m | nnn | Q | 16m |
| O | 14m | ooo | T | 19m |
| P | 15m | ppp | U | 20m |
| Q | 16m | qqq | U | 20m |
| R | 17m | rrr | Y | 24m |
| S | 18m | sss | X | 23m |
| T | 19m | ttt | X | 23m |
| U | 20m | uuu |   | Null |
| V | 21m | vvv | Y | 24m |
| W | 22m | www | Z | 25m |
| X | 23m | xxx | Z | 25m |
| Y | 24m | yyy | Z | 25m |
| Z | 25m | zzz | O | 14m |

Referring to FIG. 1B (which is a schematic diagram illustrating an exemplary data record in a "loosely associated" data structure), each element of the data structure configured as depicted in that figure and shown in Table 2, requires (m) bytes of storage, consisting of a data field 124 and an origination field 128. Thus, considerable storage savings are obtained using the loosely associated data structure of Table 2. As an example, Table 3 illustrates the potential data processing savings when comparing the number of database update queries required to maintain "tight" and "loose" associations between nodes, as described with reference to Table 1 and Table 2. For "tight" associations (Table 1), the basis is 10 total queries (as described previously herein). For "loose" associations (Table 2), the basis is four total queries (as described previously herein).

TABLE 3

| Number of Node Updates | "Tight" Association | "Loose" Association | Queries Saved |
|------------------------|---------------------|---------------------|---------------|
| 100000 | 1000000 | 400000 | 600000 |
| 1000000 | 10000000 | 4000000 | 6000000 |
| 10000000 | 100000000 | 40000000 | 60000000 |
| 100000000 | 1000000000 | 400000000 | 600000000 |
| 1000000000 | 10000000000 | 4000000000 | 6000000000 |

Table 4 shows the potential data storage savings when comparing the storage required for additional columns to maintain "tight" and "loose" associations between nodes, as described with reference to Table 1 and Table 2. For "tight" associations (Table 1), the basis is three additional indexed columns (representing group, parent, and child) at 16 bytes each, and two additional non-indexed columns (representing parent address and child address) at 12 bytes each, for a total of 72 bytes per node. For "loose" associations (Table 2), the basis is one additional indexed column (representing the originating node) at 16 bytes, and one additional non-indexed column (representing originating node address) at 12 bytes, for a total of 28 bytes.

TABLE 4

| Number of Nodes | "Tight" Association | "Loose" Association | Storage Saved |
|---|---|---|---|
| 100000 | 6.87 Mb | 2.67 Mb | 4.2 Mb |
| 1000000 | 68.66 Mb | 26.70 Mb | 41.96 Mb |
| 10000000 | 686.65 Mb | 267.03 Mb | 419.62 Mb |
| 100000000 | 6.71 Gb | 2.61 Gb | 4.1 Gb |
| 1000000000 | 67.06 Gb | 26.08 Gb | 40.98 Gb |

Figure 2:
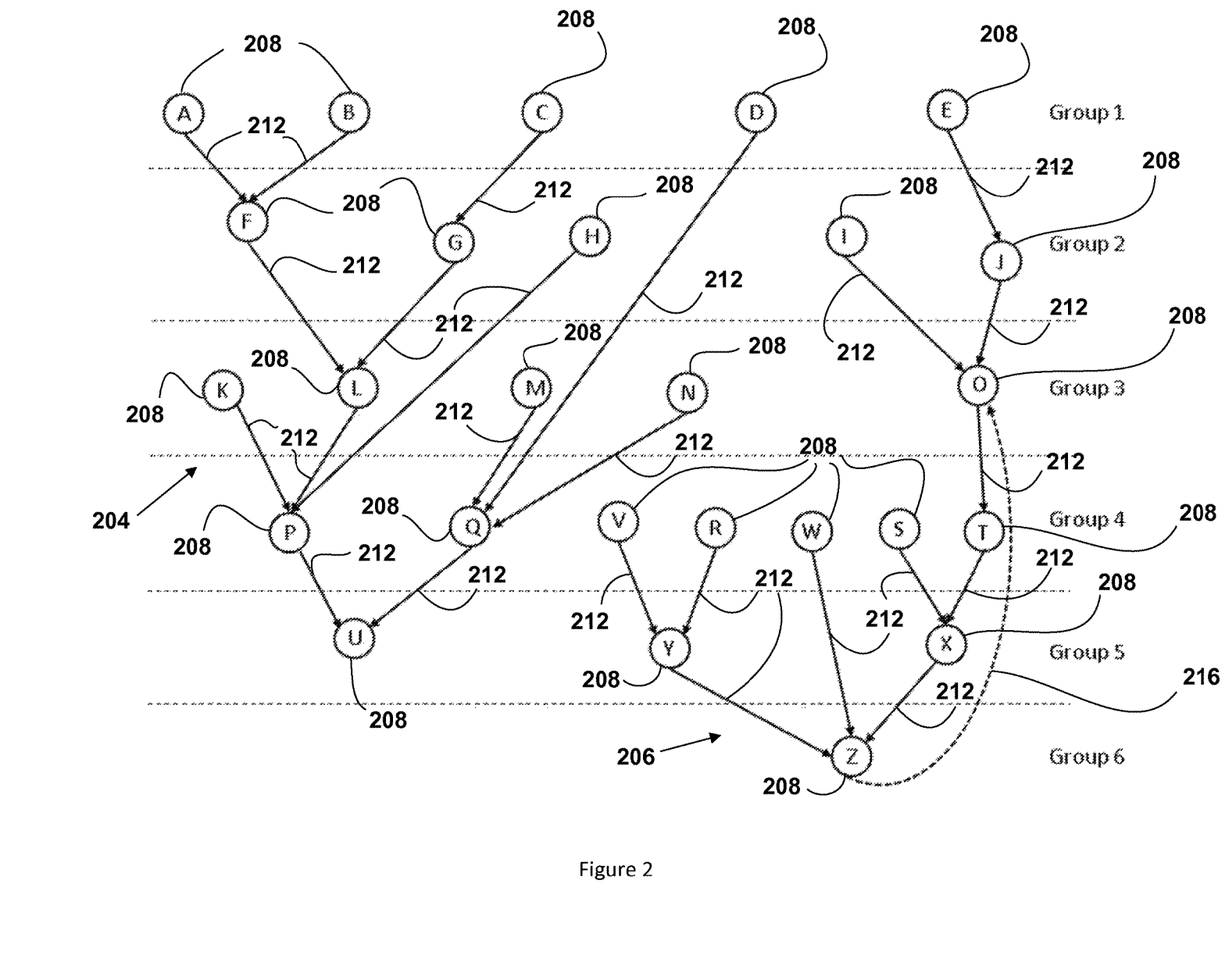
FIG. 2 is a schematic diagram illustrating the relationship between data records in an exemplary data structure suitable for use with an embodiment of the invention.

Referring to FIG. 2 (which is a schematic diagram illustrating the relationship between data records in an exemplary data structure suitable for use with an embodiment of the invention), each element (e.g., element 204 or element 206 of FIG. 2) of the data structure shown in Table 2 can be viewed as a node 208 (A)-(Z) and may be identified by a one way origination association 212 (which may be implemented as a pointer) with a single other node. For example, looking at FIG. 2, node A originates with node F and node F originates with node L. Multiple nodes may originate from a single node (e.g., both nodes F and G originate with node L). Origination paths may be circular; for instance node O originates with node T, which originates with node X, which originates with node Z, which originates back at node O.

Given the potential benefits of reduced data storage requirements and reduced database insertion and database update processing associated with a loosely associated data structure, it is advantageous to use such a structure when practical. However, iterating over a full loosely associated data structure starting from any given node in the structure as part of processing a search query or performing a database administration operation requires additional processing compared to a conventional tightly associated structure. When a given node has multiple many-to-one or recursive associations, the resulting branch overlap can cause additional inefficiencies during processing. Therefore, as recognized by the inventor, it is desirable to have an improved process to iterate efficiently over the full data structure given a starting point of any node member of that data structure.

In one embodiment of the invention, starting from a given node in a loosely associated data structure, the associated node can be found, and additional nodes identifying this same "originating node" as their associated node can be found. As recognized by the inventor, recursively repeating this process for each node found results in identification of the entire data structure. To increase efficiency, any node identified as an associated node can be skipped if it has already been determined to be part of the data structure, as this identifies an overlapping branch.

Identifying known boundary nodes can provide an additional increase to the efficiency of the inventive processing method, as processing can halt once they have been identified in the data structure, resulting in a defined subset of the overall data structure that requires additional processing. For example, when determining group associations in the inventive loosely associated data structure, groups can be defined by boundary nodes representing the start and end of the group, with nodes belonging to the group being found by use of the inventive processing (node traversal) method. This allows for a further reduction of the database storage used, as each record no longer requires a group association field or column. This benefit may be important because in certain server environments and configurations, storage space carries a significantly higher cost than memory and processor time. Therefore, reducing the overall storage required can lead to significant cost savings.

By way of a non-limiting example, the inventive loosely associated data structure traversal method, process, or algorithm as described herein can be implemented in a manner which allows for the efficient deletion of all nodes in a data structure, given any node that is a member of that structure. During the processing portion of the inventive method, a database update can be performed to mark the current node as deleted or to remove the database record for the node. A global cache can then be updated to indicate that the node has been deleted, preventing reprocessing of the node without having to check the database record's deletion status.

In an exemplary embodiment of the inventive database traversal method, a recursive process/algorithm that operates to iterate over the full set of nodes in a loosely associated data structure without processing nodes multiple times when many-to-one associations between nodes exist, and which is capable of starting from any given node in the set is implemented. Upon initiation from any node in the set of nodes in the data structure (termed the initiator or initial node) and in order to prevent additional processing attempts in a many-to-one association or looping association scenario, a globally available memory cache is checked to determine if processing for that node has already been started. If so, then there is no need to reinitiate processing and the algorithm is completed. If not, the cache is updated to indicate processing has been started for the current node, and the algorithm continues.

A check is then performed to determine if the current node is associated with any other nodes. Each node can be identified as the associated node of one or more additional nodes, where this association may be one or more of (a) being derived from another node (its originating node) or (b) as the source for one or more nodes (i.e., serving as the originating node for those nodes). To determine the associated node or nodes, a database query is performed to identify and generate a list of all other nodes that have a defined association with the current node (case (b)). As noted, in addition the current node may or may not have its own defined association with a single "originating" node (case (a)). If such an association is defined, then this originating node for the current node is added to the list of associated nodes. The combined list is filtered to remove duplicates, and to remove references to the node that initiated the processing algorithm (which may or may not be the current node). For each associated node remaining in the list, the traversal method/algorithm is reinitiated to process the associated node, and in this new iteration of the algorithm, the current node becomes the initiator and the associated node is now the current node. After all associated nodes in the list have been reinitiated and those processes have completed, processing for the current node continues and any required actions are performed for the current node. The processing method or algorithm is complete when processing of the original initiator node and all its associated nodes has been completed.

In one embodiment, before a required action is performed, a validation process may be performed to ensure that the processing of associated nodes did not alter a condition or conditions that the required action is dependent upon. By way of non-limiting example, validation may fail under various conditions, such as: the node, preceding node, or originating node having been deleted by another process; the node having already been processed; the node being locked or unlocked for transactions; a halt signal being received by the process. If any relevant conditions are met and validation completes successfully, then the required action(s) for the node are performed, which may include but are not limited to deletion of the node, recording of node properties to create a map of the data structure, modification or retrieval of node values, and/or removal of an association between nodes. After completion of the required action(s), the results of the processing and the previously recorded results of any associated nodes' processing, are returned to the initiating/originating node.

When the final iteration is complete, transversal of the full loosely associated data structure has been completed by way of recursive processing of the closest associated nodes. All possible node associations have been examined, with each node processed a single time, and the full set of returned results is available to the original initiating/originating node. This provides a complete, yet less data storage and data processing intensive alternative to conventional database structures and traversal processing methods. In some embodiments, the combination of reduced data storage requirements and reduced administrative "overhead" required to manage the data structure provides benefits and advantages in comparison to conventional approaches to defining and administering data bases and other similar data storage elements.

In a conventional traversal processing method for a node structure, the additional column values supporting the "tight" associations must be maintained during each iteration, requiring additional database update queries and data storage accesses (disk reads and writes). With the inventive database traversal method and "loose" associations, the reduction in total columns allows an overall reduction in total disk reads and writes, database update queries (by 60% as illustrated by Table 3), and disk storage (by 60% as illustrated by Table 4), with the cumulative effect of reducing processing time and disk storage resources required to maintain associations within the data structure.

Figure 3:
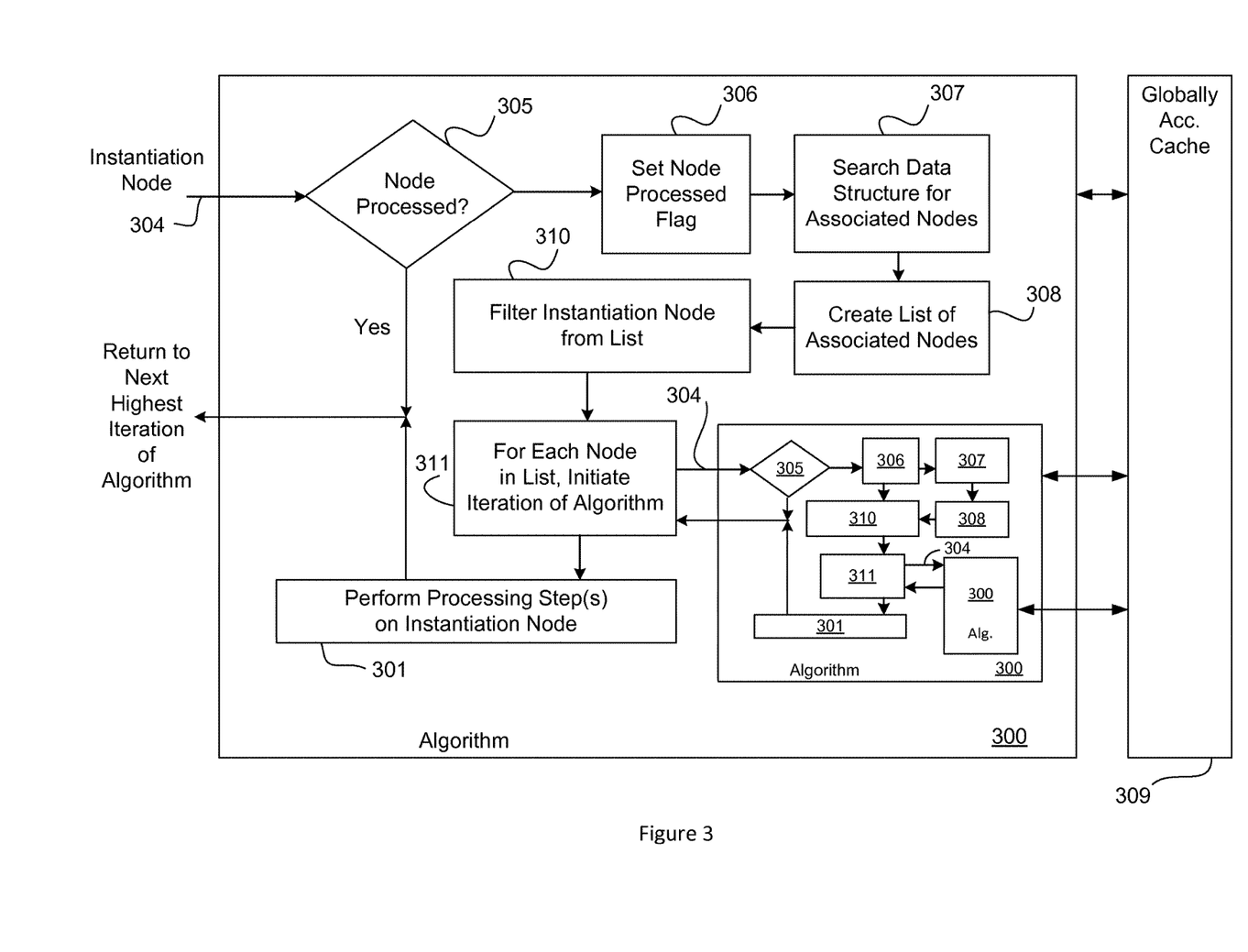
FIG. 3 is a flow chart or flow diagram illustrating the primary functional operations of a data structure processing method suitable for use in implementing an embodiment of the invention.

FIG. 3 is a flow chart or flow diagram illustrating the primary functional operations of a data structure processing method suitable for use in implementing an embodiment of the invention. Referring to FIG. 3, in an exemplary embodiment of the inventive method or algorithm 300, it may be desirable to perform some processing action 301 on an entire data structure, such as the exemplary data structure 204 shown in FIG. 2, by starting at an arbitrary node and iterating over the entire data structure 204. Depending on the complexity of the data structure, in the course of iterating over the entire data structure, the method/algorithm may recursively call itself, resulting in various levels of "wound" execution.

In the exemplary embodiment, an iteration of method/algorithm 300 receives an instantiation node 304 (which may also be referred to as an "initiator node" or "initial node"), or more accurately, a pointer to the memory address of instantiation node 304 of the data structure 204. The algorithm then tests 305 the instantiation node 304 by checking the state of a "processed" flag associated with the instantiation node 304 in a globally accessible cache 309. The state of the processed flag will inform the algorithm 300 whether or not the processing action 301 has previously been performed on instantiation node 304. If the processing action 301 has already been performed on instantiation node 304, then the current iteration of the algorithm ends and the algorithm 300 returns to the next highest iterative level. If the processing action 301 has not already been performed, then the algorithm 300 continues. The algorithm then sets 306 the processed flag associated with the instantiation node in the globally accessible cache 309 to indicate to subsequent iterations that processing action 301 has been performed on the on the node, so that the subsequent iterations will not attempt to repeat the processing action 301.

Next, the algorithm 300 searches 307 the data structure 204 for any other nodes that refer to the instantiation node as its (the other node's) originator (or originating node), as well as for the instantiation node's originator (or originating node). These nodes are listed in an array 308 for additional processing. The list is then filtered 310 to remove any duplicate nodes as well as the instantiation node, if it is present. If any nodes remain after the filtering step 310, then additional iterations of the algorithm 300 are initiated 311 for each listed node, causing lower level iterations of the algorithm to nest within the present iteration (as suggested by the inclusion of the smaller part of the figure labelled "Algorithm 300" in the lower right corner of FIG. 3). After all of the lower level iterations complete, the algorithm unwinds to the present iteration and the processing step 301 is performed on the iteration's instantiation node.

Figure 4:
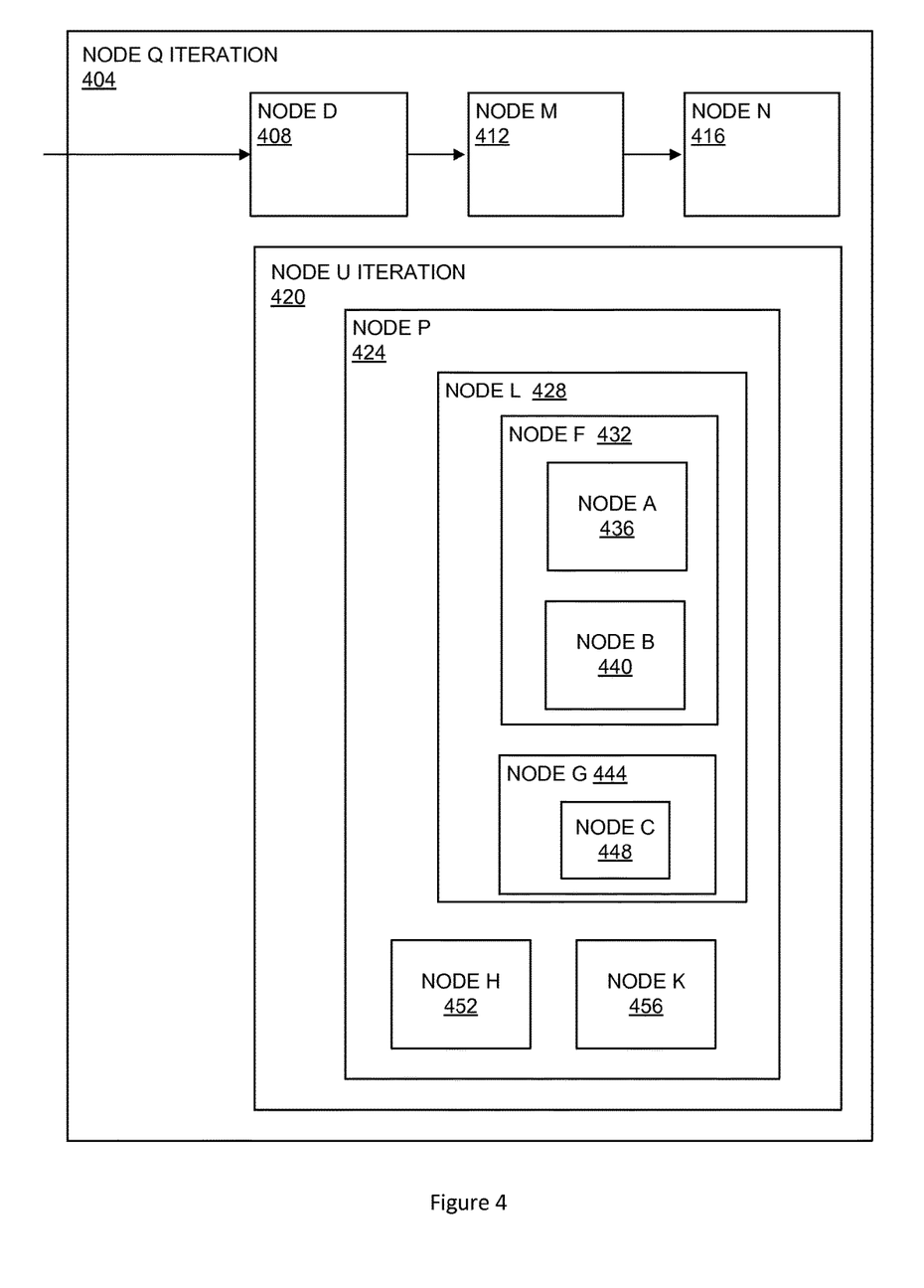
FIG. 4 is a block diagram illustrating a recursive relationship between iterations of the processing method illustrated in FIG. 3, as used in traversing the exemplary data structure of FIG. 2.

Still referring to FIG. 3 and, by way of example, also to FIGS. 1(B) and 4 (where FIG. 4 is a block diagram illustrating a recursive relationship between iterations of the processing method illustrated in FIG. 3), as used in traversing the exemplary data structure of FIG. 2, node Q may be selected as an arbitrary instantiation node 304 for an initial, top level, iteration 404 of the algorithm; however, note that any node in the data structures 204, 206 may be chosen as the initial instantiation node. Next, the first iteration 404 of the algorithm is initiated and the processed flag associated with the node Q is tested 305. During the initial iteration 404, the processed flag should always return a result indicating the current, initial instantiation node (node Q in this example) has not been processed.

If the test 305 indicates node Q has not been processed, as is expected for the initial iteration, then the algorithm sets node Q's processed flag in the globally accessible cache 309 to indicate the node has been identified for processing 306. The algorithm then searches 307 the data structure 204 for any other nodes that refer to node Q as its originator, as well as for node Q's originator. For node Q, nodes D, M, and N refer to node Q as their originator and node Q identifies node U as its originator. Nodes D, M, N and U are therefore added to the list 308. The list is then filtered 310 to remove any duplicates (none in this case), and any reference to the node originating the iteration (a null value in this instance because this is the first iteration). The algorithm then recursively calls itself 311, generating new iterations for each node in the list, D, M, N and U.

For the iteration of node D 408, the processed flag associated with node D is tested 305, which indicates node D has not been processed, and the algorithm sets node D's processed flag to indicate node D has been identified for processing 306. The algorithm then searches 307 the data structure 204 for any other nodes that refer to node D as its originator, as well as for node D's originator. No nodes refer to node D as their originator and node D identifies node Q as its originator. Node Q is therefore added to the list 308 for this iteration. However, the top-level iteration of node Q 404 initiated the present iteration of node D, so node Q 310 is removed from the list, which is now empty. No new iterations of the algorithm need be initiated. The processing steps 301 are therefore applied to node D.

The algorithm then returns to the top-level iteration of node Q 404, where it recursively initiates a new iteration 412 for the second node in the node Q's list, node M. For the iteration of node M 412, the processed flag associated with node M is tested 305, which indicates node M has not been processed, and the algorithm sets node M's processed flag to indicate node M has been identified for processing 306. The algorithm then searches the data structure 204 for any other nodes that refer to node M as its originator, as well as for node M's originator. No nodes refer to node M as their originator and node M identifies node Q as its originator. Node Q is therefore added to the list for node M's iteration. However, as in the case of node D's iteration, the top-level iteration of node Q initiated the present iteration of node M, so node Q is removed from the list, which is now empty. No new iterations of the algorithm need be initiated. The processing steps 301 are applied to node M.

The algorithm then returns to the top-level iteration of node Q 404, where it recursively initiates a new iteration 416 for the third node in the node Q's list, node N. For the iteration of node N 416, the processed flag associated with node N is tested 305, which indicates node N has not been processed, and the algorithm sets node N's processed flag to indicate node N has been identified for processing 306. The algorithm then searches 307 the data structure 204 for any other nodes that refer to node N as its originator, as well as node N's originator. No nodes refer to node N as their originator and node N identifies node Q as its originator. Node Q is therefore added to the list of 308. However, the top-level iteration of node Q initiated the present iteration of node N, so node Q is removed from the list 310, which is now empty. No new iterations of the algorithm need be initiated. The processing steps 301 are applied to node N.

The algorithm then returns to the top-level iteration of node Q 404, where it recursively initiates a new iteration 420 for the last node in the node Q's list, node U. For the iteration of node U 420, the processed flag 306 associated with node U is tested 305, which indicates that node U has not been processed. The algorithm then sets node U's processed flag to indicate node U has been identified for processing 306. The algorithm then searches 307 the data structure 204 for any other nodes that refer to node U as its originator, as well as node U's originator. Nodes P and Q identify node U as their originator, and node U does not identify any node as its originator. Nodes Q and P are therefore added to the list 308. However, the top-level iteration of node Q 404 initiated the present iteration of node U 420, so node Q is removed from the list, which now contains only node P.

The algorithm then recursively initiates a new iteration 424 for the only node in the list, node P. For the iteration of node P 424, the processed flag associated with node P is tested 305, which indicates node P has not been processed. The algorithm then sets node P's processed flag to indicate node P has been identified for processing 306. The algorithm then searches 307 the data structure 204 for any other nodes that refer to node P as its originator, as well as node P's originator. Nodes L, H, and K identify node P as their originator and node P identifies node U as its originator. Nodes L, H, K, and P are therefore added to the list 308. However, the one-level higher iteration of node U 420 initiated the present iteration of node P 424, so node U is removed from the list 310, which now contains nodes L, H, and K. The algorithm recursively initiates a new iteration 428 for the first node in the list, node L.

For the iteration of node L 428, the processed flag associated with node L is tested 305, which indicates node L has not been processed. The algorithm then sets node L's processed flag to indicate node L has been identified for processing 306. The algorithm then searches 307 the data structure 204 for any other nodes that refer to node L as its originator, as well as node L's originator. Nodes F and G identify node L as their originator and node L identifies node P as its originator. Nodes F, G and P are therefore added to the list 308. However, the one-level higher iteration of node P 424 initiated the present iteration of node L 428, so node P is removed from the list 310 which now contains only nodes F and G. The algorithm recursively initiates a new iteration 432 for the first node in the list, node F.

For the iteration of node F 432, the processed flag associated with node F is tested 305, which indicates node F has not been processed. The algorithm then sets node F's processed flag to indicate node F has been identified for processing 306. The algorithm then searches 307 the data structure 204 for any other nodes that refer to node F as its originator, as well as node F's originator. Nodes A and B identify node F as their originator and node F identifies node L as its originator. Nodes A, B, and L are therefore added to the list 308. However, the one-level higher iteration of node L 428 initiated the present iteration of node F 432, so node L is removed from the list 310, which now contains only nodes A and B. The algorithm recursively initiates a new iteration for the first node in the list, node A.

For the iteration of node A 436, the processed flag associated with node A is tested 305, which indicates node A has not been processed. The algorithm sets node A's processed flag to indicate node A has been identified for processing. The algorithm then searches 307 the data structure 204 for any other nodes that refer to node A as its originator, as well as node A's originator. No nodes refer to node A as their originator and node A identifies node F as its originator. Node F is therefore added to the list 308. However, the one-level higher iteration of node F initiated the present iteration of node B, so node F is removed from the list 310, which is now empty. No new iterations of the algorithm need be initiated. The processing steps 301 are applied to node A.

The algorithm then returns to the higher-level iteration of node F, where it recursively initiates a new iteration 440 for the second node in that iteration's list, node B. For the iteration of node B 440, the processed flag associated with node B is tested 305, which indicates node B has not been processed. The algorithm sets node B's processed flag to indicate node B has been identified for processing 306. The algorithm then searches the data structure 204 for any other nodes that refer to node B as its originators, well as node B's originator. No nodes refer to node B as their originator and node B identifies node F as its originator. Node F is therefore added to the list 308. However, the one-level higher iteration of node F initiated the present iteration of node B, so node F is removed from the list 310, which is now empty. No new iterations of the algorithm need be initiated. The processing steps 301 are applied to node B.

After processing node B, the algorithm returns to the one-level higher iteration of node F 432. All iterations of nodes in the list from the iteration of node F have now been processed, and the processing steps 301 are now applied to node F. The algorithm then returns to the next highest iteration, that of node L 428, and initiates a new iteration 444 for the next node in the list, node G.

For the iteration of node G 444, the processed flag associated with node G is tested 305, which indicates node G has not been processed. The algorithm then sets node G's processed flag to indicate node G has been identified for processing 306. The algorithm then searches the data structure 204 for any other nodes that refer to node G as its originator, as well as node G's originator. Node C identifies node G as its originator and node G identifies node L as its originator. Nodes C and L are therefore added to the list 308. However, the one-level higher iteration of node L initiated the present iteration of node G, so node L is removed from the list 310, which now contains only node C. The algorithm recursively initiates a new iteration 448 for the only node in the list, node C.

For the iteration of node C 448, the processed flag 306 associated with node C is tested 305, which indicates node C has not been processed. The algorithm sets node C's processed flag to indicate node C has been identified for processing 306. The algorithm then searches 307 the data structure 204 for any other nodes that refer to node C as its originator, as well as node C's originator. No nodes refer to node C as their originator and node C identifies node G as its originator. Node G is therefore added to the list 308. However, the one-level higher iteration of node G initiated the present iteration of node C, so node G is removed from the list 310, which is now empty. No new iterations of the algorithm need be initiated. The processing steps 301 are applied to node C.

After processing node C, the algorithm returns to the one-level higher iteration of node G 444. All iterations of nodes in the list from the iteration of node G 444 have now been processed, and the processing steps 301 are now applied to node G. The algorithm then returns to the next highest iteration, that of node L 428. All iterations of nodes in the list from the iteration of node L 428 have now been processed, and the processing steps 301 are now applied to node L. The algorithm then returns to the next highest iteration, that of node P 428 and initiates a new iteration 452 for the next node in that iteration's list, node H.

For the iteration of node H 452, the processed flag associated with node H is tested 305, which indicates node H has not been processed. The algorithm sets node H's processed flag to indicate node H has been identified for processing 306. The algorithm then searches 307 the data structure 204 for any other nodes that refer to node H as its originator, as well as node H's originator. No nodes refer to node H as their originator and node H identifies node P as its originator. Node P is therefore added to the list 308. However, the one-level higher iteration of node P initiated the present iteration of node H, so node P is removed from the list 310, which is now empty. No new iterations of the algorithm need be initiated. The processing steps 301 are applied to node H. The algorithm then returns to the next highest iteration, that of node P 424 and initiates a new iteration 456 for the next node in that iteration's list, node K.

For the iteration of node K 456, the processed flag associated with node K is tested 305, which indicates node K has not been processed. The algorithm sets node K's processed flag to indicate node K has been identified for processing 306. The algorithm then searches 307 the data structure 204 for any other nodes that refer to node K as its originator, as well as node K's originator. No nodes refer to node K as their originator and node K identifies node P as its originator. Node P is therefore added to the list 308. However, the one-level higher iteration of node P initiated the present iteration of node K, so node P is removed from the list 310, which is now empty. No new iterations of the algorithm need be initiated. The processing steps 301 are applied to node K.

The algorithm then returns to the next highest iteration, that of node P 424. All iterations of nodes in the list from the iteration of node P have now been processed and the processing steps 301 are now applied to node P. The algorithm then returns to the next highest iteration, that of node U 420. All iterations of nodes in the global cache from the iteration of node U have now been processed and the processing steps are now applied to node U. The algorithm then returns to the top-level iteration, that of node Q 404. All iterations of nodes in the list from the iteration of node Q have now been processed and the processing steps are now applied to node Q. The algorithm is now complete.

Figure 5:
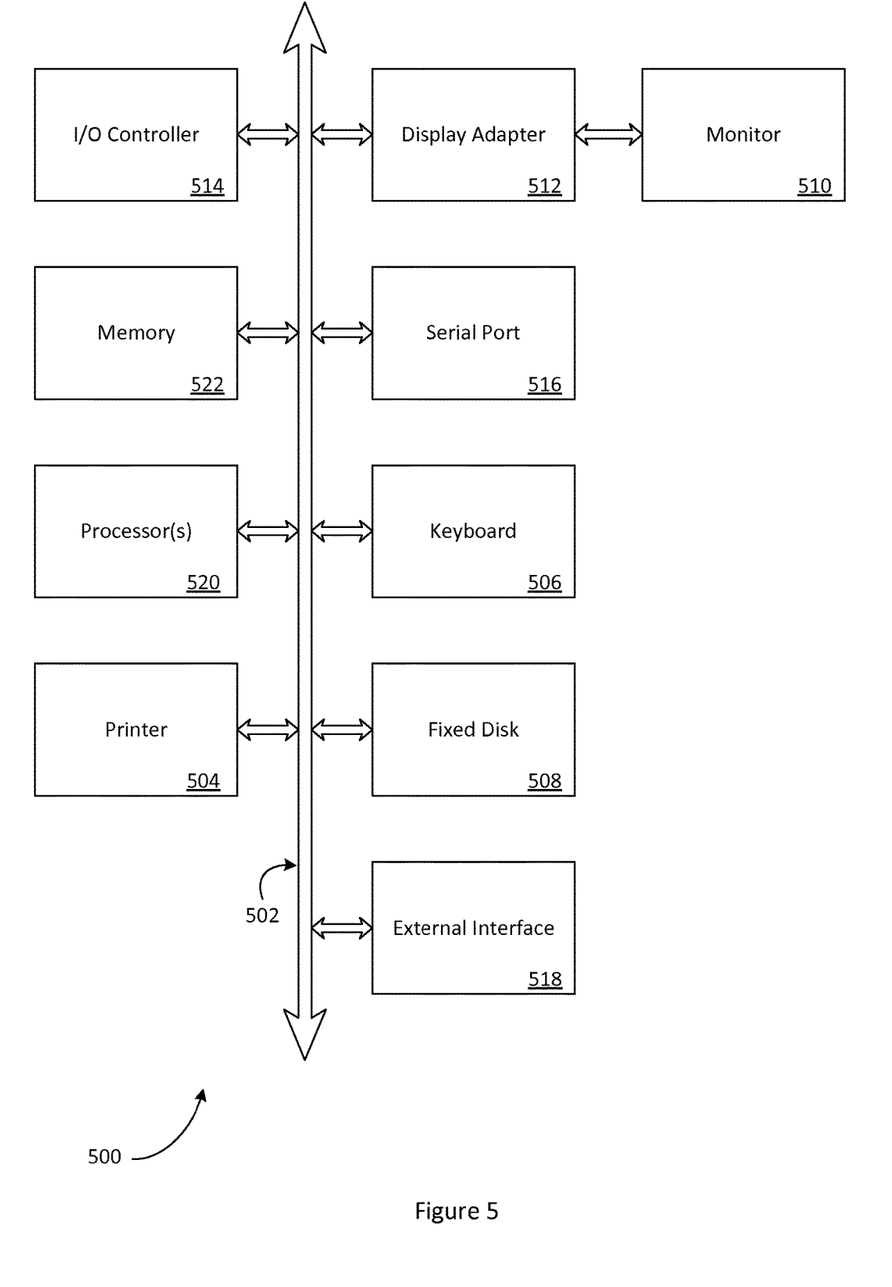
FIG. 5 is a schematic diagram illustrating elements of a non-limiting, exemplary computing architecture suitable for implementing an embodiment of the present invention.

By way of example, FIG. 5 is a schematic diagram illustrating elements of a non-limiting, exemplary computing architecture 500 suitable for implementing an embodiment of the present invention. Computing architecture 500 may, in part or in whole, be a component of a computing device or data processing device that implements an embodiment of the inventive database traversal method described herein and may be used to implement one or more of the processes, methods, functions, or operations described. The inventive search method may be implemented by a processor, microprocessor, or controller that is programmed to execute a set of instructions. The instructions may be stored in a data storage element. A database that includes the inventive loosely associated data structure described herein may be stored in the same or a different data storage element (such as one contained in a server). When executed, the set of instructions operate to cause the computing device or data processing device to implement the inventive database search or query processing over the database that includes the loosely associated data structure. This permits locating and accessing the data value(s) associated with a particular node or location within a database and performing one or more desired operations on the data and/or node.

The architecture 500 includes subsystems interconnected via a system bus 502. They subsystems may include a printer 504, a keyboard 506, a fixed disk 508, a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++, or Perl, using, for example, conventional or object-oriented techniques. The software code may be stored as a series of instructions, or commands on a computer readable medium, such as a random access memory (RAM) a read-only memory (ROM), a magnetic medium such as a hard-drive, a solid-state device such as a flash memory drive, or an optical medium such as a CD-ROM. Any such computer readable medium may reside on or within a single computational apparatus, and may be present on or within different computational apparatuses within a system or network.

Different arrangements of the components depicted in the drawings or described above, as well as components and steps not shown or described, are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method of performing a processing step on each node of a loosely associated data structure, the method comprising:
   (a) arbitrarily identifying an initial node from a plurality of nodes of the loosely associated data structure, wherein each one of the plurality of nodes comprises a single association identifier storing information about an originating node of the one of the plurality of nodes, where the originating node has a parent association to the one of the plurality of nodes in the loosely associated data structure;
   (b) receiving a single association identifier of the initial node of the loosely associated data structure;
   (c) checking a processed flag associated with the initial node in a globally accessible cache memory to determine whether the processing step has already been performed on the initial node;
   (d) if the processed flag associated with the initial node is absent in the globally accessible cache memory, then performing sub-steps, comprising:
      (i) identifying an originating node of the initial node based on the single association identifier;
      (ii) performing a database query and determining one or more associated nodes that refer to the initial node as an originating node;
      (iii) adding the associated nodes and the originating node of the initial node to a stored list;
      (iv) filtering the stored list to remove one or more duplicates of the associated nodes and one or more duplicates of the originating node, and removing associated node references to each of the remaining nodes that initiated the processing step in the list; and
      (v) setting a processed flag to the initial node in the globally accessible cache memory;
   (e) if the processed flag associated with the initial node is present in the globally accessible cache memory, then performing sub-steps, comprising:
      (i) receiving a single association identifier of at least one of the originating nodes of the initial node in the loosely associated data structure;
      (ii) checking a processed flag of the at least one of the originating nodes of the initial node in the globally accessible cache memory to determine whether the processing step has already been performed on the at least one of the originating nodes of the initial node;
      (iii) if the processed flag associated with the at least one of the originating nodes is absent, then performing step (d); and
      (iv) if the processed flag associated with the at least one of the originating nodes is present, then performing step (e);
   (f) performing steps (a) through (e) for at least one node identified in the stored list until all the nodes in the loosely associated data structure are associated with the processed flags and ceasing to repeat steps (a) through (e); and
   (g) performing the processing step on the initial node.

2. The method of claim 1, wherein the processing step is one of deleting a node of the loosely associated data structure or performing a data processing operation on data associated with a node of the loosely associated data structure.

3. The method of claim 1, wherein filtering the stored list to remove one or more duplicate nodes further comprises filtering the stored list to remove the initial node.

4. The method of claim 1, wherein prior to performing the processing step on the initial node, the method further comprises determining if one or more conditions related to the processing of the node are satisfied.

5. The method of claim 1, wherein the single association identifier further comprises a memory address of the one of the plurality of nodes and the memory address of the originating node of the one of the plurality of nodes, and wherein the memory addresses of the one of the plurality of nodes and the originating node of the one of the plurality of nodes are stored in the cache memory, and further wherein the checking the processed flag in the cache memory is performed using at least in part the stored memory addresses.

6. A system, comprising:
   a loosely associated data structure containing a plurality of nodes;
   a processor programmed to implement a search process in response to a search query, wherein the search process comprises
      (a) arbitrarily identifying an initial node from a plurality of nodes of the loosely associated data structure, wherein each one of the plurality of nodes comprises a single association identifier storing information about an originating node of the one of the plurality of nodes, where the originating node has a parent association to the one of the plurality of nodes in the loosely associated data structure;
      (b) receiving a single association identifier of the initial node of the loosely associated data structure;
      (c) checking a processed flag associated with the initial node in a globally accessible cache memory to determine whether the processing step has already been performed on the initial node;
      (d) if the processed flag associated with the initial node is absent in the globally accessible cache memory, then performing sub-steps, comprising:
         (i) identifying an originating node of the initial node based on the single association identifier;
         (ii) performing a database query and determining one or more associated nodes that refer to the initial node as an originating node;
         (iii) adding the associated nodes and the originating node of the initial node to a stored list;
         (iv) filtering the stored list to remove one or more duplicates of the associated nodes and one or more duplicates of the originating node, and removing associated node references to each of the remaining nodes that initiated the processing step in the list; and
         (v) setting a processed flag to the initial node in the globally accessible cache memory;

(e) if the processed flag associated with the initial node is present in the globally accessible cache memory, then performing sub-steps, comprising:
  (i) receiving a single association identifier of at least one of the originating nodes of the initial node in the loosely associated data structure;
  (ii) checking a processed flag of the at least one of the originating nodes of the initial node in the globally accessible cache memory to determine whether the processing step has already been performed on the at least one of the originating nodes of the initial node;
  (iii) if the processed flag associated with the at least one of the originating nodes is absent, then performing step (d); and
  (iv) if the processed flag associated with the at least one of the originating nodes is present, then performing step (e);
(f) performing steps (a) through (for at least one node identified in the stored list until all the nodes in the loosely associated data structure are associated with the processed flags and ceasing to repeat steps (a) through (e); and
(g) performing the processing step on the initial node.

7. The system of claim 6, wherein the processing step is one of deleting a node of the loosely associated data structure or performing a data processing operation on data associated with a node of the loosely associated data structure.

8. The system of claim 6, wherein filtering the stored list to remove one or more duplicate nodes further comprises filtering the stored list to remove the initial node.

9. The system of claim 6, wherein prior to performing the processing step on the initial node, the method further comprises determining if one or more conditions related to the processing of the node are satisfied.

10. The system of claim 6, wherein the single association identifier further comprises a memory address of the one of the plurality of nodes and the memory address of the originating node of the one of the plurality of nodes, and wherein the memory addresses of the one of the plurality of nodes and the originating node of the one of the plurality of nodes are stored in the cache memory, and further wherein the checking the processed flag in the cache memory is performed using at least in part the stored memory addresses.

11. An apparatus operable to implement a search of a data structure in response to a search query, comprising:
  a processor programmed to execute a set of instructions;
  a data storage element in which the set of instructions are stored; and
  a database comprising a plurality of nodes, wherein each node is associated with an originating node, and wherein when executed by the processor the set of instructions cause the apparatus to
(a) arbitrarily identifying an initial node from a plurality of nodes of the loosely associated data structure, wherein each one of the plurality of nodes comprises a single association identifier storing information about an originating node of the one of the plurality of nodes, where the originating node has a parent association to the one of the plurality of nodes in the loosely associated data structure;
(b) receiving a single association identifier of the initial node of the loosely associated data structure;
(c) checking a processed flag associated with the initial node in a globally accessible cache memory to determine whether the processing step has already been performed on the initial node;
(d) if the processed flag associated with the initial node is absent in the globally accessible cache memory, then performing sub-steps, comprising:
  (i) identifying an originating node of the initial node based on the single association identifier,
  (ii) performing a database query and determining one or more associated nodes that refer to the initial node as an originating node;
  (iii) adding the associated nodes and the originating node of the initial node to a stored list;
  (iv) filtering the stored list to remove one or more duplicates of the associated nodes and one or more duplicates of the originating node, and removing associated node references to each of the remaining nodes that initiated the processing step in the list; and
  (v) setting a processed flag to the initial node in the globally accessible cache memory;
(e) if the processed flag associated with the initial node is present in the globally accessible cache memory, then performing sub-steps, comprising:
  (i) receiving a single association identifier of at least one of the originating nodes of the initial node in the loosely associated data structure;
  (ii) checking a processed flag of the at least one of the originating nodes of the initial node in the globally accessible cache memory to determine whether the processing step has already been performed on the at least one of the originating nodes of the initial node;
  (iii) if the processed flag associated with the at least one of the originating nodes is absent, then performing step (d); and
  (iv) if the processed flag associated with the at least one of the originating nodes is present, then performing step (e);
(f) performing steps (a) through (e) for at least one node identified in the stored list until all the nodes in the loosely associated data structure are associated with the processed flags and ceasing to repeat steps (a) through (e); and
(g) performing the processing step on the initial node.

12. The apparatus of claim 11, wherein the processing step is one of deleting a node of the loosely associated data structure or performing a data processing operation on data associated with a node of the loosely associated data structure.

13. The apparatus of claim 11, wherein filtering the stored list to remove one or more duplicate nodes further comprises filtering the stored list to remove the initial node.

14. The apparatus of claim 11, wherein prior to performing the processing step on the initial node, the method further comprises determining if one or more conditions related to the processing of the node are satisfied.

15. The apparatus of claim 11, wherein the single association identifier further comprises a memory address of the one of the plurality of nodes and the memory address of the originating node of the one of the plurality of nodes, and wherein the memory addresses of the one of the plurality of nodes and the originating node of the one of the plurality of nodes are stored in the cache memory, and further wherein the checking the processed flag in the cache memory is performed using at least in part the stored memory addresses.

* * * * *